United States Patent
Valin et al.

[11] Patent Number: 6,126,199
[45] Date of Patent: Oct. 3, 2000

[54] TUBULAR CRADLE FOR A MOTOR VEHICLE

[75] Inventors: Daniel Valin, Saint-Amand-sur-Fion; Philippe Deletombe, Chalons-sur-Marne, both of France

[73] Assignee: Vallourec Composants Automobiles Vitry, Vitry-le-Francois, France

[21] Appl. No.: 08/983,586

[22] PCT Filed: Jul. 25, 1996

[86] PCT No.: PCT/FR96/01171

§ 371 Date: Jan. 22, 1998

§ 102(e) Date: Jan. 22, 1998

[87] PCT Pub. No.: WO97/05007

PCT Pub. Date: Feb. 13, 1997

[30] Foreign Application Priority Data

Jul. 28, 1995 [FR] France .................. 95 09444

[51] Int. Cl.[7] .................................................. B62D 21/00
[52] U.S. Cl. ...................... 280/781; 280/785; 280/796
[58] Field of Search ......................... 280/781, 785, 280/796, 791, 788, 124.109; 296/204, 205; 180/311; 29/897.2

[56] References Cited

U.S. PATENT DOCUMENTS 5,332,281  7/1994  Janotik et al. .................. 296/209

FOREIGN PATENT DOCUMENTS 0 568 251  11/1993  European Pat. Off. .
0713 791   5/1996   European Pat. Off. .
2 590 847  5/1988   France .

OTHER PUBLICATIONS

Eldred, A. et al, "Vari–Form—a hydroforming technique for manufacturing complex tubular components", Technische Mitteilungen Krupp, vol. 294a, No. 1, Apr. 1994, pp. 45–50
l'Usine Nouvelle, Mar. 24, 1994, p. 68.

*Primary Examiner*—Brian L. Johnson
*Assistant Examiner*—Faye M. Fleming
*Attorney, Agent, or Firm*—Jacobson, Price, Holman & Stern, PLLC

[57] ABSTRACT

An integral tubular metal cradle (1) for a motor vehicle, comprising tubular central portion (2) with two arms (5, 6 or 7,8) extending from each end (3,4) thereof and having a substantially open, semi-tubular cross-section, the arms being at a dihedral angle of less than 180° at the point of connection to the central portion (2). The arms (5,6,7,8) provide a connection both to the vehicle bodywork and to either a front wheel wishbone or the rear axle of the vehicle. A method for making the integral tubular metal cradle is also provided.

15 Claims, 3 Drawing Sheets

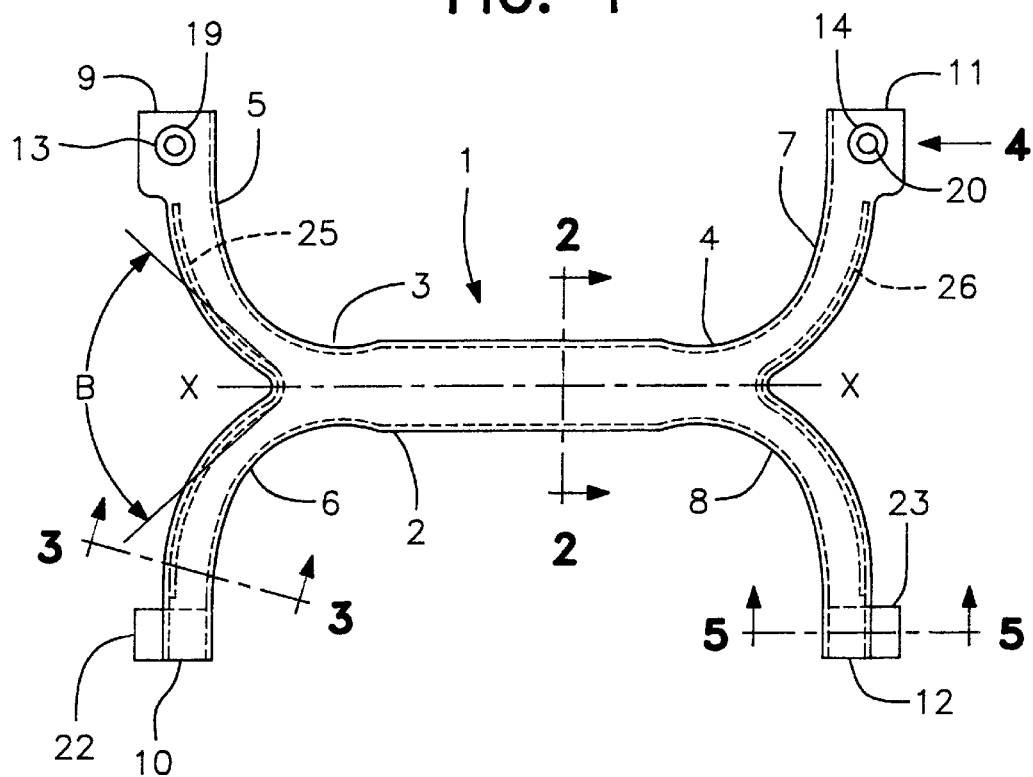

TUBULAR CRADLE FOR A MOTOR VEHICLE

BACKGROUND OF THE INVENTION

1. Field of the Invention

The invention relates to a metal sub-frame for a motor vehicle and to a method for producing such a sub-frame.

2. Description of the Related Art

What is intended by "motor vehicle" is any motorized four-wheeled vehicle, particularly utility vehicles and touring cars.

In this description and in this patent, what is meant by "sub-frame" is a structural component, generally made of metal, for a motor vehicle, providing a direct or indirect connection between, on the one hand, the body of the vehicle and, on the other hand, either the front wheels or the rear axle of said vehicle. A sub-frame of this kind has a central region consisting of a profile which needs to have sufficient transverse stiffness that it can withstand the bending stresses created by the movement of the wheels, to each end of which central region there are secured two profiled arms which, directly or indirectly and on each side of this central region, provide a connection with the body and with a front wheel wishbone or the rear axle.

What is meant by "front wheel wishbone" in this patent is the component conventionally known as the wishbone or any part which has a function equivalent to that of a wishbone.

The front sub-frame of a motor vehicle thus generally has, at each of the two ends of the central region, means of connection to the body and means of connection to a front wheel wishbone. It also generally has attachment means for a torque rod connected to the engine, for an anti-sway bar and for the steering rack of the vehicle. A front sub-frame of this kind therefore needs to be strong enough that it can withstand the bending forces generated by the movement of the wheels, and take up the engine torque and the forces coming from the anti-sway bar and the steering rack. Another function of this sub-frame is to damp and filter all of these forces and vibration and noise resulting from them, for the comfort of the passengers of the vehicle.

The rear sub-frame of a motor vehicle generally has, at each of the two ends of the central region, means of connection to the body and means of connection to the rear axle assembly. Its principal function is to provide a second stage of filtering of the horizontal and vertical forces and of vibration and noise resulting therefrom, the first stage of filtering being performed by the rear axle assembly itself, the purpose of this being further to improve the comfort of the passengers; this solution employing a rear sub-frame is quite expensive and is chiefly used in so-called top-of-the-range vehicles. This rear sub-frame also needs to be mechanically able to withstand the forces to be filtered, although these forces impose far less stress than in the case of the front sub-frame.

Metal sub-frames of this kind are already known and consist of two pressed half shells welded together longitudinally. Each pressed half shell has an open profiled central region with the transverse shape of a U, which is extended at each of its two ends by two open profiled arms in the shape of a U, the assembly having the longitudinal shape of an H. A longitudinal weld, which may or may not be continuous, connects the edges of the open U-profiles of the central region and of the arms of each half shell. The two closed profiled arms at each end of the central region, which consist of open profiled arms joined together by the weld, are used for securing the body, generally by two connecting points, and the other for securing, at one or more connecting points, either the wishbone of a front wheel or the rear axle. The securing of other elements may be envisaged, for example, in the case of the front sub-frame, these might be elements such as the steering rack, the engine torque rod and an anti-sway bar, these being secured via attachment means.

A sub-frame of this kind displays a number of drawbacks. It is expensive to manufacture because it requires two pressing operations starting from shaped metal blanks, and this causes material to be wasted. For making the longitudinal weld it is also necessary to provide a strip of metal along each half shell, which strip has no other use, and this makes the sub-frame heavier and increases its size. What is more, the weld constitutes a region which is more vulnerable to the repeat stresses applied to the sub-frame, particularly the bending stresses generated by the movement of the wheels. Finally, the sub-frame thus produced is a closed piece, and this makes it difficult for the previously-described connecting and attachment means to be secured in a convenient way that can withstand the stresses.

The invention has sought to overcome these drawbacks and to design a metal sub-frame which, while retaining enough rigidity that it can take up the forces applied to it, allows the wasting of metal in manufacturing it to be minimized, its weight to be reduced, which is very favorable in the case of a vehicle, its compactness to be increased, which makes the overall design of the vehicle easier, the welded regions which are vulnerable to repeat stresses to be minimized, and finally, allows more robust securing of the connecting and attachment means.

BRIEF SUMMARY OF THE INVENTION

The sub-frame according to the invention has a one-piece tubular metal structure, that is to say it consists of a single length of tube. As a preference, it is made of steel.

The sub-frame according to the invention has a tubular central region extended at each of its two ends by two arms which, in the transverse direction, have approximately the cross section of an open half tube and form between them, where they leave the end of the central region, a dihedral angle of less than 180°, the two arms of each end providing a direct or indirect connection on the one hand with the body and, on the other hand, with either the wishbone of a front wheel or the rear axle of the vehicle.

A sub-frame of this type which, according to the invention, is one-piece tubular, gives a weight saving on account of the good rigidity of the tubular cross section, particularly with regard to the bending forces from the wheels. Its weldless one-piece design makes it very compact and less vulnerable to the repeat stresses. Finally, its open design offers a number of simple and robust ways of securing the connection and attachment means.

The central region preferably has a simple tubular section which is not necessarily circular, allowing it to withstand the stresses imposed on the sub-frame. It may be cylindrical, or have curvature between its two ends, that is to say that it may have a bend between its central part and each of its two ends, depending on the constructional features of the vehicle. It may advantageously have an expanded tubular cross section between its two ends to increase its rigidity, that is to say that it may have a larger cross section in its central part than at its two ends. If necessary, a more complicated but tubular profile formed of a deformed tube, for example deformed into a U or into a Y, may be given to this central region in order to improve its resistance to certain stresses. The thickness of the tube in the central region is not necessarily constant; it may vary in order to obtain greater rigidity only where needed, thus making it possible to minimize the weight of the component.

The four arms, two at each end of the central region, in the transverse direction have approximately the cross section of an open half tube, it being possible for the cross section to be uniform or otherwise along the entire length of the arms. As a preference, they have a U shape which gives them good mechanical strength. The two arms of each end of the central region are used to secure the body, preferably using a first connecting means, and to secure the wishbone of a front wheel, if this is a front sub-frame, or the rear axle of the vehicle, if this is a rear sub-frame, preferably also by means of a second connecting means.

Advantageously, the first connecting means for the body acts at two points of the two arms of each end of the central region. The two arms of each end do not necessarily have the same length. Nor are they necessarily symmetric with one another. The thickness of the half tube is not necessarily constant along the length of the arms: it may vary along the arm so as to have the best ability to withstand the actual distribution of the forces.

The one-piece sub-frame thus formed of a tubular central region extended by two arms which have approximately the cross section of an open half tube, preferably in the overall shape of an H, has a structure which, because it is open for the arms, greatly facilitates the securing of the body, of the front wheel wishbone or of the rear axle, and the securing, if necessary, of attachment means for the steering rack, the engine torque rod and an anti-sway bar. Compared with the known solution described at the beginning of the present description, the invention offers great flexibility to form a sub-frame allowing a wide variety of connecting and attachment means which can be incorporated into the open structure, making the sub-frame stronger and more compact.

In particular, the connecting or attachment means advantageously have a profiled part which fits into the profile of the open half tube of the arms, to which profile they are then joined by welding.

Advantageously, the first connecting means for the body is positioned or comprises at least one component which is positioned at the end of one of the arms of each end of the central region. In this case, the end of the corresponding arms is very advantageously given the shape of a flattened U, each leg of the U comprising an approximately central hole facing the hole in the other leg. A sleeve, with a diameter very slightly smaller than that of the holes and a length which is longer than the external width of the flattened U is placed transversely to the U inside said holes. The ends of this sleeve protrude from each leg and are secured to each of these legs by welding. This design allows a bought-out elastic suspension component to be fitted directly, preferably to the end of the arm, and this gives a very simple and very compact assembly.

When the stresses applied to the sub-frame according to the invention are very high, particularly for vehicle front sub-frames, the two arms of each end may be connected by a reinforcing means. Various types of reinforcing means can be used.

As a preference, the means of reinforcing each end is a pressed metal strip welded inside the open half tubes of the two arms to close them completely or partially.

Other types of reinforcing means may be envisaged, for example ones having a pressed profile welded to the outside or inside of the open half tube of the two arms in order to close them completely or partially. More complicated reinforcements may be designed, for example by closing the profile of open half tube of the arms locally by deformation or by combining them with connecting or attachment means secured to the arms.

The fitting of reinforcing means does not in any way reduce the basic strength qualities of the sub-frame according to the invention. This is because the welds on the reinforcing means are not along the main line of action of the sub-frame which is the longitudinal axis joining the two wheels, and the welds are therefore not subject to the main bending forces.

Nor does the fitting of reinforcing means detract from the open-structure quality of the sub-frame according to the invention. This is because these reinforcements can be fitted only after the sub-frame has been equipped with the necessary connecting or attachment means.

The invention also relates to a method of producing a one-piece tubular metal sub-frame for an automobile.

According to the invention, the method uses a single length of metal tube.

The tube is preferably made of steel. Its thickness and section are not necessarily uniform.

The following operations are performed on this length of tube:

the central region is immobilized in shaped clamping jaws on a machine such as a press, longitudinal cut is made in a first end of the length of tube in an approximately diametral plane using known cutting means which are not described, in order to obtain two open half tubes. The length of the cut is calculated as a function of the longer of the two arms of this end of the central region of the sub-frame to be manufactured, in the same way, a longitudinal cut is made in the second end of the length of tube in an approximately diametral plane using known cutting means, the length of the cut being calculated as a function of the longer of the two arms of this end of the central region of the sub-frame to be manufactured, in order to obtain two open half tubes, the cuts in each end are advantageously made simultaneously in a single step, next, the two arms of a first end of the central region are formed by parting and by deforming the two open half tubes of a first end of the length of tube using a shaped die, the central region being immobilized in the clamping jaws. The shaped die, moved by known means such as a hydraulic ram, advances toward this first end of the length of tube in one or more steps and parts and deforms the two open half tubes until they form between them, where they leave the central region, a dihedral angle of less than 180°, in the same way, the two arms of the second end of the central region are formed by parting and by deforming the two open half tubes of the second end of the length of tube using a shaped die in such a way that they form between them, where they leave the central region, a dihedral angle of less than 180°, advantageously, the operations of parting and of deforming the two ends of the length of tube are carried out simultaneously and preferably in a single step, the last step consists in cutting the arms of each end to length using known cutting means.

When the parting angle is large, uniformly spaced notches are made by known means which are not described, along the cut edges of the open half tubes, before the parting operation, so as to avoid cracking during the operation of shaping the arms. In this case, it is also possible for the operation of parting the arms to be carried out in several stages with differently-shaped dies in order to reach the desired shape gradually.

Highly advantageously, each end of the tube is shaped before cutting, this being done using known means which are not described, in order to give the arms better ability to withstand the mechanical stresses. As a preference, each end is given a rectangular shape with rounded corners, in order to obtain U-shaped arms. The central region may also be shaped to give it better strength or a shape that suits the geometry of the vehicle.

This shaping may take place before or after the steps described earlier of cutting and of shaping the arms. For example, the central region may be given some curvature between its two ends, that is to say that the two ends of this central region are held still using a tool of appropriate shape and that the metal is deformed to obtain a bend between the central part and each of the two ends of said central region. The central region can also be given a more complicated deformed-tube profile, for example a U or Y-shaped profile.

The central region can also be expanded before or after the cutting and the shaping of the arms. In order to shape the central region, use is very advantageously made of the hydroforming technique, and this is preferably done prior to the cutting and shaping of the arms. To do this, the following operations are carried out in a press:

a) the two ends of the starting length of tube are immobilized in conventional clamping jaws, b) the central region is trapped in jaws the shape of which is a function of the expanded profile to be obtained, c) the central region is expanded by injecting fluid at high pressure which plastically deforms the wall until it presses against the shaped jaws of operation b, it being possible for operations b) and c) to be conducted or not completely or partially simultaneously.

This technique is highly advantageous in the case of the sub-frame according to the invention because the ends of the length of tube which are used to clamp it, and which are usually wasted when components are produced by hydroforming, are in this case used to produce the arms, thus minimizing the wastage of materials.

The last operation in the method according to the invention consists in equipping the sub-frame with the connecting means for securing the body and the front wheel wishbone or the rear axle, this being done by known assembly techniques; if necessary, the two arms of each end are connected using reinforcing means, as has already been described; attachment means can also be provided, in the case of a front sub-frame for example.

Very advantageously, the end of an arm is modified into a U shape to make it able to receive directly a bought-out elastic suspension component for connection to the body, and this gives a simple and compact assembly; to achieve this, the following steps are carried out:

a) the end of the arm is flattened by flaring it by any known means so that the legs of the U are close together b) a circular hole is made right through each leg, approximately in the center c) a tubular sleeve with a diameter slightly smaller than that of said hole is introduced into this hole, and one end of the sleeve protrudes out of each leg d) the sleeve is welded to each leg.

The example and figures below give a nonlimiting description of one embodiment of the sub-frame and of the method according to the invention.

BRIEF DESCRIPTION OF THE DRAWINGS

FIG. 1 is a diagrammatic view of a front sub-frame according to the invention.

FIG. 2 is section 2—2 of FIG. 1.

FIG. 3 is section 3—3 of FIG. 1, on a larger scale.

FIG. 4 is the part view in the Direction of 4 of FIG. 1, on a larger scale.

FIG. 5 is section 5—5 of FIG. 1, on a larger scale.

DETAILED DESCRIPTION OF THE INVENTION

FIG. 1 diagrammatically depicts a one-piece tubular front sub-frame 1 according to the invention, which in this embodiment is H-shaped.

Figure 6:
FIG. 6 is a section of the starting length of tube of the method according to the invention.

This component has a tubular central region 2 of circular cross section expanded between its two ends 3, 4, that is to say that the diameter of its central part is greater than that of its two ends. FIG. 2 shows the section 40 on 2—2 of the central part of the expanded region, which is larger than the section 41, depicted in FIG. 6, of the starting tube. Each end 3, 4 of the central region 2 is extended by two arms 5, 6, 7, 8 forming between them, where they leave the end 3, 4 of the central region 2, a dihedral angle B of about 90°, the angle B being marked only on the end 3 in order not to clutter the figure. The four arms 5, 6, 7, 8 have the U-shape of an open half tube as can be seen at reference 43 in FIG. 3.

The arms 5 and 7 above the axis X—X of the front sub-frame 1 are used for connection to the body of the vehicle. The end 9, 11 of each of the arms 5, 7 is flattened and flared and has a hole 13, 14 in its center. FIG. 4, which is the part view on 4 of FIG. 1, describes the detail of the end 11 of the arm 7, the walls 15 and 16 of which are brought closer together by comparison with the walls 17, 18 of the rest of the arm 7. A tubular sleeve 20 of a bought-out elastic suspension component with a diameter very slightly smaller than that of the hole 14 and a length that exceeds the width between legs 15, 16 of the end 11, is placed transversely to the end 11 inside the holes, one end of the sleeve 20 protruding from each leg, securing being by welding 21 to each leg 15, 16.

In the same way, as can be seen in FIG. 1, the sleeve 19 of a bought-out elastic suspension component is secured to the end 9 of the arm 5 in the way which has just been described.

The arms 6 and 8 below the axis X—X of the front sub-frame 1 are used for connection to the front wishbone of a wheel of the vehicle. A component 22, 23 is secured to the end 10, 12 of each of the arms 6, 8. FIG. 5, which is the section on 5—5 of FIG. 1, describes the detail of the end 12 of the arm 8 wherein it can be seen that the component 23 is fitted into the end 12 and secured by a weld 24 to the two legs of this end. The component 22 is secured to the end 10 of the arm 6 in the same way. The top of the component 23, 22 respectively, is assembled elastically with one of the three attachment points of the front wheel wishbone.

A reinforcement 25, 26 consisting of a metal strip is fitted into and welded inside the paired arms 5, 6 and 7, 8 respectively, to close them between their ends 9, 10 and 11, 12. FIG. 3, which is section 3—3 of FIG. 1, shows the reinforcement 25 fitted into the profile 43 of the arm 6 and secured thereto by the welds 27.

This front sub-frame 1 is also equipped with another component for connection to the body, with another component for connection to the front wheel wishbone, and with various attachment points to suit the design of the vehicle. These connecting components and attachment points are not depicted in order not to clutter FIG. 1.

Figure 7:
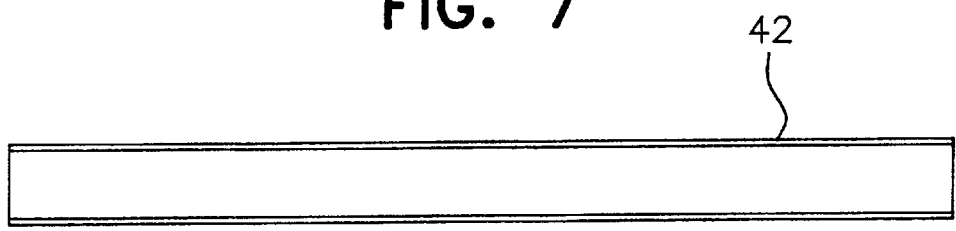
FIG. 7 is a view of the starting length of tube used for the method according to the invention.
Figure 8:
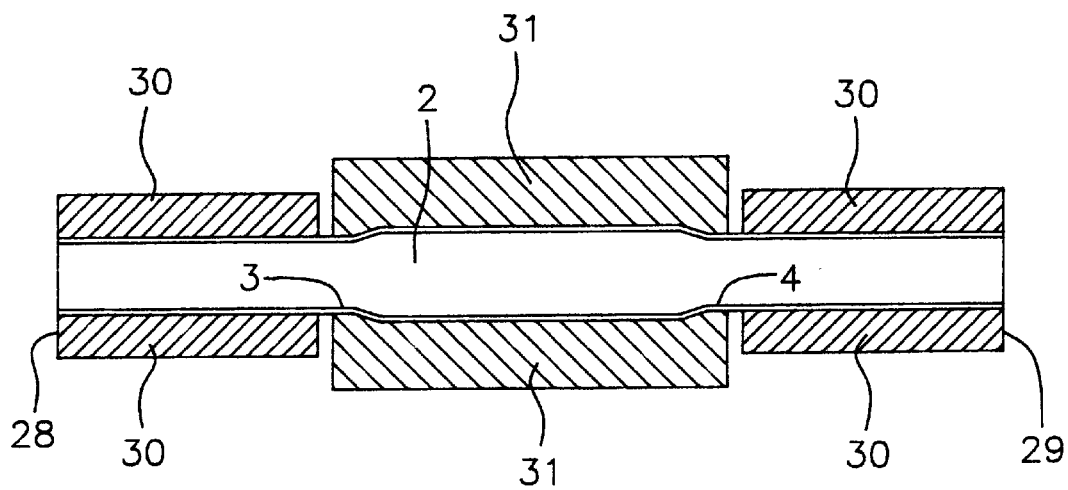
FIG. 8 is a diagrammatic view of the hydroforming phase of the method according to the invention.

FIG. 8 diagrammatically illustrates the first phase of the method of producing the sub-frame 1 according to the invention: this is the expansion of the central region 2 by hydroforming. The starting point is a length of steel tube 42, FIG. 7, of circular section 41 depicted in FIG. 6, the two ends 28, 29 of which are immobilized in the clamping jaws 30 on a machine, not depicted, such as a press. The central region 2 is trapped between its two ends 3, 4 in jaws 31 the shape of which is designed to obtain the expanded profile 40 of FIG. 2. The central region 2 is expanded between its ends 3, 4 by injecting fluid at high pressure which plastically deforms the wall until it contacts the shaped jaws 31.

Next, having freed the length of tube 42, the two ends of this length of tube 42 on each side of the ends 3, 4 of the central region 2 are given a rectangular shape with rounded corners using conventional shaping means.

Figure 9:
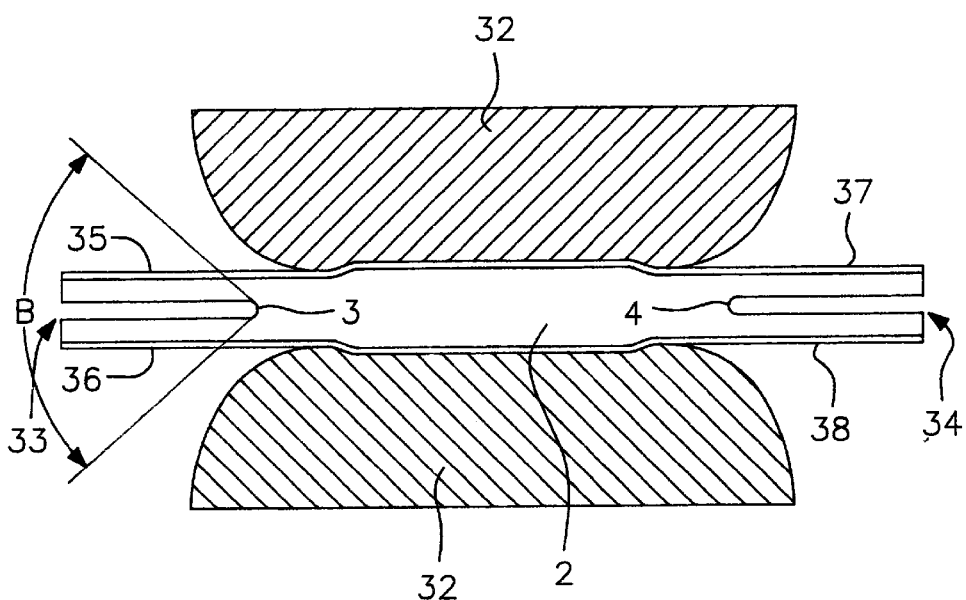
FIG. 9 is a diagrammatic view of the step of cutting the arms of the method according to the invention.

FIG. 9 diagrammatically depicts the next step in the method according to the invention. On a machine, not depicted, such as a press, the central region 2 is immobilized between its ends 3 and 4 in shaped clamping jaws 32 and a cut 33, 34 is made in each end of the starting length of tube simultaneously, using known means which are not described. Each cut 33, 34 which is in the diametral plane of the tube, extends as far as the end 3, 4 of the central region 2 and delimits two open half tubes 35, 36, 37, 38.

Figure 10:
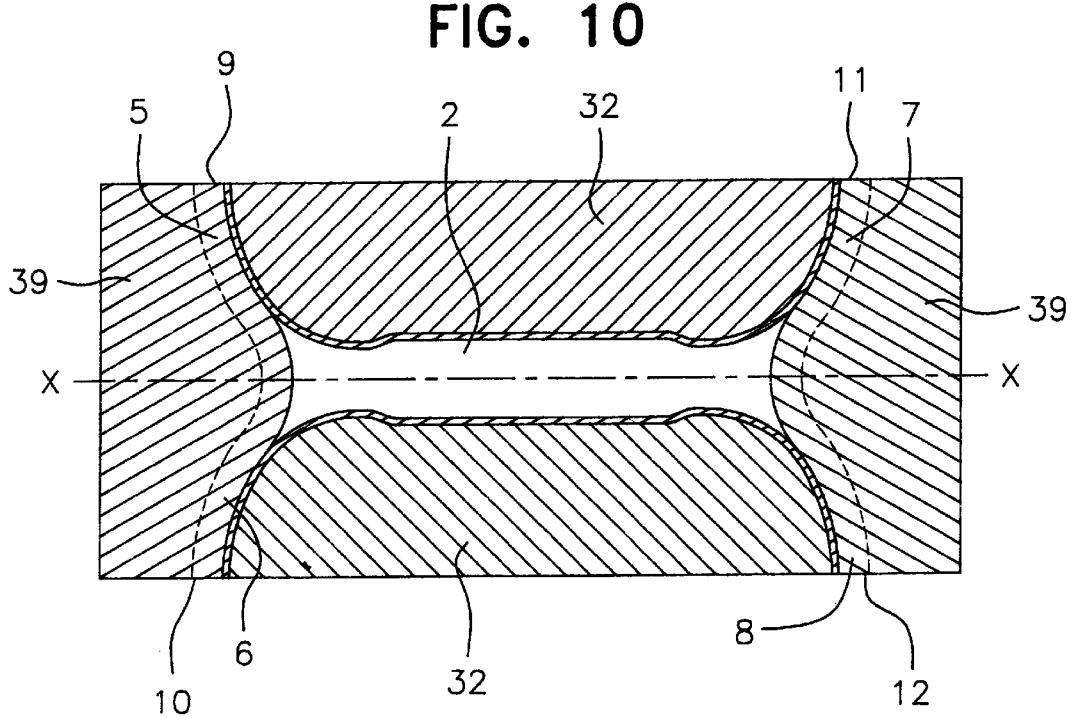
FIG. 10 is a diagrammatic view of the step of parting the arms according to the invention, at the end of deformation.

FIG. 10 diagrammatically depicts the next step in the method according to the invention.

With the central region still immobilized by the jaws 32, the arms 5, 6, 7, 8 are shaped by parting and deforming the open half tubes 35, 36, 37, 38 using two shaped dies 39 moved by hydraulic rams, not depicted, which advance simultaneously and gradually toward the open half tubes 35, 36, 37, 38 and part them until they form between them, where they leave the central region, a dihedral angle B of about 90°, the angle B being depicted only in the left-hand part in order not to clutter the figure.

Next, the arms 5, 6, 7, 8 are cut to the desired length in a known way by means which are not described. To obtain the front sub-frame 1 (FIG. 1) according to the invention, the following steps then need to be carried out using conventional means which are not described:

a) the end 9, 11 of each of the arms 5, 7 above the axis X—X is flattened and flared to move the legs of the U closer together b) a circular hole 13, 14 is made right through each flattened end at their center c) a sleeve 19, 20 with a diameter slightly smaller than that of the hole 13, 14 and an end of which protrudes from each leg of the U is inserted into each hole 13, 14 d) the sleeve 19, 20 is welded to the legs of the U e) a component 22, 23 for connecting with the front wishbone of a wheel is fitted into the end 10, 12 of each arm 6, 8 below the axis X—X f) the component 22, 23 is welded to the end 10, 12 of each arm 6, 8 g) a reinforcement 25, 26 consisting of a metal strip is welded inside the paired arms 5, 6 and 7, 8 to close them between their ends 9, 10 and 11, 12.

Steps e) and f) may be carried out before step a).

Likewise, step g) may be carried out before step a) or between steps d) and e).

Numerous alternative forms of the embodiment described are possible and do not depart from the scope of the invention, especially as far as the shape of the central region, the shape of the arms, the presence or absence of reinforcing means, the shape of the reinforcing means, and the way of producing the connection with the body and with either the front wheel wishbone or the rear axle are concerned.

What is claimed is:

1. A sub-frame for a motor vehicle, comprising a metal, one-piece, tubular structure, the sub-frame having a tubular central region with two opposed ends, the sub-frame having two arms extending from each of the two opposed ends of the tubular central region, the two arms having a cross-section substantially in a shape of an open half tube, the two arms extending from each of the opposed ends of the tubular central region defining a dihedral angle between the two arms of less than 180°, whereby the arms are adapted to provide a connection with a body of the motor vehicle or with either a wishbone of a front wheel of the motor vehicle in the case of a front sub-frame or with a rear axle of the motor vehicle in the case of a rear sub-frame.

2. The sub-frame of claim 1, wherein the tubular central region has a curvature between a central portion and the two opposed ends of the tubular central region.

3. The sub-frame of claim 1, wherein the tubular central region has a larger cross-section in a central portion than at the two opposed ends of the tubular central region.

4. The sub-frame of claim 1, wherein the tubular central region has a U or Y shape.

5. The sub-frame of claim 1, wherein a first connecting means is mounted on at least one arm at each of the two opposed ends of the tubular central region whereby the at least one arm is adapted to provide a connection with the body of the motor vehicle.

6. The sub-frame of claim 5, wherein the first connecting means is positioned at the end of the at least one arm.

7. The sub-frame of claim 5, wherein the first connecting means comprises at least one component which is positioned at the end of the at least one arm.

8. The sub-frame of claim 6, wherein the end of the at least one arm has a shape in cross-section of a flattened U with opposed legs, each leg having a central hole facing the hole in the opposed leg.

9. The sub-frame of claim 6, wherein the first connecting means comprises at least one elastic suspension component mounted on the end of the at least one arm.

10. The sub-frame of claim 1, wherein a second connecting means is mounted on at least one arm at each of the two opposed ends of the tubular central region whereby the at least one arm is adapted to provide a connection with the front wheel wishbone or the rear axle.

11. The sub-frame of claim 1, wherein the arms have a U-shape in cross section.

12. The sub-frame of claim 1, wherein the arms are connected by a reinforcing means.

13. The sub-frame of claim 12, wherein the reinforcing means is a pressed metal strip fitted and welded inside the open half tubes of the arms thus completely or partially closing the half tubes.

14. The sub-frame of claim 1, wherein the metal is steel.

15. The sub-frame of claim 1, wherein both arms at the same end of the tubular central region are connected by a reinforcing means.

* * * * *